Feb. 1, 1927.

P. CLAVIER

HOOK FOR BREAST COLLARS

Filed Nov. 19, 1924

Inventor
P. Clavier
by Jn. Junie
Atty

Patented Feb. 1, 1927.

1,616,350

UNITED STATES PATENT OFFICE.

PIERRE CLAVIER, OF TARBES, FRANCE.

HOOK FOR BREAST COLLARS.

Application filed November 19, 1924, Serial No. 750,937, and in France November 23, 1923.

The object of my invention is to provide a hook for breast-collars adapted to be secured by means of screws or by any other suitable means and to be closed by a non-projecting plate constantly influenced by a spring.

Figure 1:
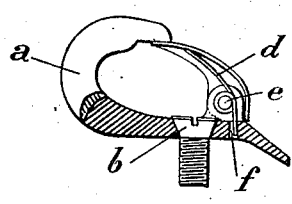
Figure 2:
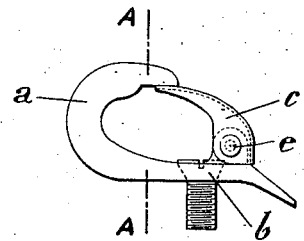
Figure 3:
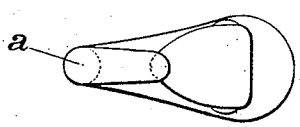
Figure 4:
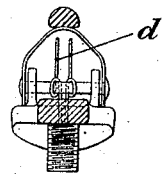
Figure 5:
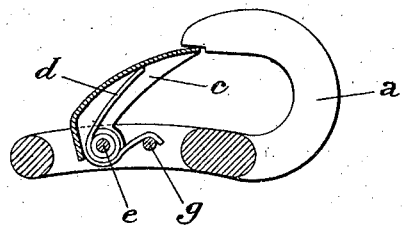
Figure 6:
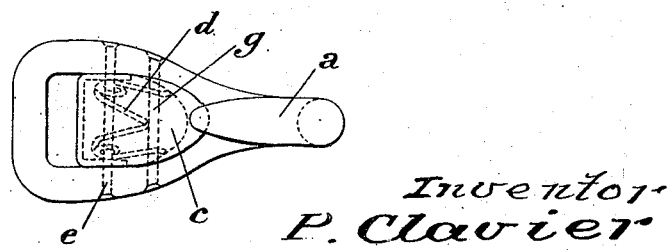

In order to make my invention more clearly understood, I have illustrated as examples two embodiments of the same in and by drawings appended hereto and wherein:

Figs. 1 to 4 show a hook wherein the closing plate's antagonistic spring has one of its ends engaging into a hollow in the body of the hook, while Figures 5 and 6 shows a hook whereof the antagonistic spring has one of its ends engaging round a spindle or a crosspiece of the hook's body.

Referring now to the said appended drawings, $a$ is the body of the hook provided with its setting screw $b$ and round which the closing plate $c$ pivots. Said plate, preferably pressed without any indents nor protruding angles is constantly influenced by a four-branched antagonistic spring $d$ coiling round the pivoting axis $e$ of the plate and one end of which is maintained in a hole $f$ made in body $a$.

In the modified embodiment shown by Figures 5 and 6 the fixed branches of two twin springs $d$, instead of being maintained in hole $f$ of the loop like body $a$, cap a spindle or crossing $g$ set in the body $a$.

As will be readily realized, the object of my invention is chiefly to protect against all interference by the buckle work and against any friction the springs arranged within the pressed plate as well as the latter which is arranged within the body.

I wish it to be clearly understood, that I do not intend my invention to be limited to breast collars and that it can be applied to all sorts of hooks and such like, while the securing device of the hook to the collar or to the breast plate may be of any kind (screw, die, bolt, etc.).

Having now particularly ascertained and described the nature of my said invention as well as manners in which the same is to be performed, I declare that what I claim is, A hook comprising a body portion and a bill portion, posts rising from the body portion in spaced relation, a closing member having an end wall and side walls, said side walls being arranged on the outer sides of the respective posts, a pivot pin passing through the side walls of the closing member and said posts, and a spring coiled on the pivot pin and having one terminal seated in and opening in the body between the posts, the opposite terminal of the spring standing within the closing member and terminating near the free end thereof.

Signed at Bordeaux, in the Department of Gironde France this 7th day of November, A. D. 1924.

PIERRE CLAVIER.